US012190239B2

(12) United States Patent
Kakizaki et al.

(10) Patent No.: US 12,190,239 B2
(45) Date of Patent: Jan. 7, 2025

(54) MODEL BUILDING APPARATUS, MODEL BUILDING METHOD, COMPUTER PROGRAM AND RECORDING MEDIUM

(71) Applicant: NEC Corporation, Tokyo (JP)

(72) Inventors: Kazuya Kakizaki, Tokyo (JP); Kosuke Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 821 days.

(21) Appl. No.: 17/429,789

(22) PCT Filed: Feb. 12, 2019

(86) PCT No.: PCT/JP2019/004822
§ 371 (c)(1),
(2) Date: Aug. 10, 2021

(87) PCT Pub. No.: WO2020/165935
PCT Pub. Date: Aug. 20, 2020

(65) Prior Publication Data
US 2022/0121991 A1    Apr. 21, 2022

(51) Int. Cl.
*G06N 3/08*    (2023.01)
*G06F 18/2413*    (2023.01)
*G06F 21/36*    (2013.01)

(52) U.S. Cl.
CPC ........... *G06N 3/08* (2013.01); *G06F 18/2413* (2023.01); *G06F 21/36* (2013.01)

(58) Field of Classification Search
CPC ...... G06N 3/08; G06N 3/084; G06F 18/2413; G06F 21/36

(Continued)

(56) References Cited

U.S. PATENT DOCUMENTS 9,875,440 B1 *   1/2018  Commons .............. G06N 3/045
10,254,641 B2 *  4/2019  Mailfert ................ G06F 30/398
(Continued)

FOREIGN PATENT DOCUMENTS

CN    110574120 A  * 12/2019  ....... G01N 33/57492
CN    113672197 B  *  7/2024  ............. G06F 7/483
(Continued)

OTHER PUBLICATIONS

International Search Report for PCT Application No. PCT/JP2019/004822, mailed on Apr. 23, 2019.
(Continued)

*Primary Examiner* — Mahendra R Patel
(74) *Attorney, Agent, or Firm* — Sughrue Mion, PLLC

(57) ABSTRACT

A model building apparatus includes: a building unit that builds a generation model that outputs an adversarial example, which causes misclassification by a learned model, when a source sample is entered into the generation model; and a calculating unit that calculates a first evaluation value and a second evaluation value, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model. The building unit builds the generation model by updating the generation model such that an index value based on the first and second evaluation values is smaller.

8 Claims, 8 Drawing Sheets

(58) Field of Classification Search
USPC ..................................................... 382/155
See application file for complete search history.

(56) References Cited

U.S. PATENT DOCUMENTS

| | | | | |
|---|---|---|---|---|
| 10,460,235 | B1* | 10/2019 | Truong | G06F 30/20 |
| 10,909,681 | B2* | 2/2021 | Hsiao | G06V 10/82 |
| 11,423,263 | B2* | 8/2022 | Kobayashi | G06F 17/18 |
| 11,580,383 | B2* | 2/2023 | Ishii | G06N 3/084 |
| 11,610,132 | B2* | 3/2023 | Hewage | G06N 3/045 |
| 2009/0141969 | A1* | 6/2009 | Yu | G06N 3/08 382/157 |
| 2014/0074762 | A1* | 3/2014 | Campbell | G06Q 40/00 706/46 |
| 2016/0096270 | A1* | 4/2016 | Ibarz Gabardos | B25J 9/0081 901/3 |
| 2017/0278135 | A1* | 9/2017 | Majumdar | G06V 40/10 |
| 2017/0316281 | A1* | 11/2017 | Criminisi | G06F 18/2148 |
| 2019/0005386 | A1* | 1/2019 | Chen | G06V 10/82 |
| 2019/0130216 | A1* | 5/2019 | Tomioka | G06F 18/214 |
| 2019/0244348 | A1* | 8/2019 | Buckler | G06T 7/0012 |
| 2020/0234162 | A1* | 7/2020 | Jayaraman | G06N 20/00 |
| 2020/0251213 | A1* | 8/2020 | Tran | G06N 20/00 |

FOREIGN PATENT DOCUMENTS

| | | | | |
|---|---|---|---|---|
| WO | WO-2016207875 | A1 * | 12/2016 | ......... G06K 9/00442 |
| WO | WO-2019079182 | A1 * | 4/2019 | ............. G06F 18/00 |
| WO | WO-2019207770 | A1 * | 10/2019 | ........... G06N 3/0454 |

OTHER PUBLICATIONS

Nicholas Carlini et al., "Towards Evaluating the Robustness of Neural Networks", IEEE Symposium on Security and Privacy (SPs), 2017, pp. 1-19.

Yunjey Choi et al., "StarGAN: Unified Generative Adversarial Networks for Multi-Domain Image-to-Image Translation", IEEE Conference on Computer Vision and Pattern Recognition (CVPR), 2018, pp. 1-15.

Shumeet Baluja et al., "Adversarial Transformation Networks Learning to Generate Adversarial examples", [online], Mar. 28, 2017 [retrieved on Apr. 15, 2019], Retrieved from the Internet: <URL: https://arxiv.org/abs/1703.09387>, pp. 1-13.

Chaowei Xiao et al., "Generating Adversarial Examples with Adversarial Networks", Proceedings of the Twenty SeSeventh International Joint Conference on Artificial Intelligence(IJCAI-18). International Joint Conferences on Artificial Intelligence, Jul. 19. 2018, p. 3905-p. 3911, https://www.ijcai.org/proceedings/2018/0543.pdf.

* cited by examiner

MODEL BUILDING APPARATUS, MODEL BUILDING METHOD, COMPUTER PROGRAM AND RECORDING MEDIUM

This application is a National Stage Entry of PCT/JP2019/004822 filed on Feb. 12, 2019, the contents of all of which are incorporated herein by reference, in their entirety.

TECHNICAL FIELD

The present invention relates to a model building apparatus, a model building method, a computer program and a recording medium that can build a generation model for generating an adversarial example.

BACKGROUND ART

A learned model that has learned by using deep learning or the like has vulnerability with respect to an adversarial example that is generated to deceive the learned model. Specifically, if the adversarial example is entered into a learned model, the learned model may not be able to correctly classify (i.e., may misclassify) the adversarial example. For example, when a sample that is entered into a learned model is an image, the image that is classified into a class "A" for humans but is classified into a class "B" when it is entered into the learned model is used as the adversarial example.

Non-Patent Literature 1 describes a method of generating such an adversarial example. Specifically, Non-Patent Literature 1 describes a method of generating an adversarial example in which when the adversarial example is generated by adding a minute noise that cannot be recognized by human eyes to a source image, the added noise is relatively small (i.e., a difference in a visual feature from the source image is relatively small) by solving an optimization problem with constraints on the size of the noise.

In addition, Non-Patent Literature 2 is cited as a patent literature related to the present invention, even though there is no description regarding the adversarial example.

CITATION LIST

Non-Patent Literature

Non-Patent Literature 1: Nicholas Carlini, David Wagner, "Towards Evaluating the Robustness of Neural Networks", IEEE Symposium on Security and Privacy (SPs), 2017

Non-Patent Literature 2: Yunjey Choi, Minje Choi, Munyoung Kim, Jung-Woo Ha, Sunghun Kim, Jaegul Choo, "StarGAN: Unified Generative Adversarial Networks for Multi-Domain Image-to-Image Translation", IEEE Conference on Computer Vision and Pattern Recognition (CVPR), 2018

SUMMARY OF INVENTION

Technical Problem

The adversarial example described above is available to update the learned model (in other words, improve, train, or allow the learned model to learn) so as to eliminate the vulnerability due to the adversarial example (e.g., so as not to misclassify the adversarial example). Therefore, in order to update a certain learned model, it is desired to generate an adversarial example that may cause misclassification by the learned model.

Non-Patent Literature 1 described above only describes a method of generating an adversarial example in which a difference in a visual feature from the source image is relatively small (that is, it looks almost the same as the source image to human eyes). On the other hand, even the image that is generated by intentionally adding to the source image a change that is recognizable by human eyes, but humans do not feel unnatural, is available as an adversarial example, as long as the image causes the misclassification by the learned model. That is, there may be an adversarial example with different visual feature from that of the source image. Therefore, in order to update a certain learned model, it is desired to generate an adversarial example with different visual feature from that of the source image. However, Non-Patent Literature 1 does not describe any method of generating the adversarial example with different visual feature from that of the source image. This results in a technical problem that a learned model cannot be updated by using the adversarial example with different visual feature from that of the source image.

Also, not only in the learned model into which an image is entered, but also in a learned model into which any sample is entered, similarly, there is such a technical problem that a learned model cannot be updated by using the adversarial example with different visual feature from that of a source sample.

It is therefore an example object of the present invention to provide a model building apparatus, a model building method, a computer program, and a recording medium that can solve the technical problems described above. By way of example, an example object of the present invention is to provide a model building apparatus, a model building method, a computer program, and a recording medium that can build a generation model for generating an adversarial example with different visual feature from that of a source sample.

Solution to Problem

A model building apparatus according to an example aspect of the present invention includes: a building unit that builds a generation model that outputs an adversarial example, which causes misclassification by a learned model, when a source sample is entered into the generation model; and a calculating unit that calculates a first evaluation value and a second evaluation value, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model, wherein the building unit builds the generation model by updating the generation model such that an index value based on the first and second evaluation values is smaller.

A model building method according to an example aspect of the present invention includes: a building step at which a generation model is built, wherein the generation model outputs an adversarial example, which causes misclassification by a learned model, when a source sample is entered into the generation model; and a calculating step at which a first evaluation value and a second evaluation value are calculated, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model, wherein the generation model is built in the building step by updating the generation model such that an index value based on the first and second evaluation values is smaller.

A computer program according to an example aspect of the present invention allows a computer to perform the model building method according to the example aspect described above.

A recording medium according to an example aspect of the of the present invention is a recording medium on which the computer program according to the example aspect described above is recorded.

Advantageous Effects of Invention

According to the model building apparatus, the model building method, the computer program, and the recording medium in the respective example aspects described above, a generation model for generating an adversarial example with different visual feature from that of a source sample is appropriately built.

DESCRIPTION OF EXAMPLE EMBODIMENTS

Hereinafter, a model building apparatus, a model building method, a computer program, and a recording medium according to example embodiments will be described with reference to the drawings. The following describes the model building apparatus, the model building method, the computer program, and the recording medium according to the example embodiments, by using a sample generation apparatus 1 that generates a generation model G for gener-ating an adversarial example AX and that generates an adversarial example AX from the generated generation model G.

The adversarial example AX is a sample that causes misclassification by a machine learning model f when it is entered into the learned machine learning model f. Specifically, the machine learning model f is an arithmetic model that outputs, in response to a sample entered into the machine learning model f, an output information corresponding to the sample. In the present example embodiment, the machine learning model f is an arithmetic model that outputs an output information indicating which class of a plurality of classes the entered sample belongs to. That is, the machine learning model f is configured to function as a so-called classifier. When the adversarial example AX is entered into such a machine learning model f, the machine learning model f outputs an output information indicating that the adversarial example AX belongs to a class "B", which is different from a class "A", even though the machine learning model f should originally output an output information indicating that the adversarial example AX belongs to the class "A".

In this example embodiment, suppose that the sample entered into the machine learning model f is an image (that is, data relating to the image). In this case, for example, the image that is classified into a class "C" for humans, but is classified into a class "D", which is different from the class "C", when it is entered into the learned model f, is available as the adversarial example AX.

The machine learning model f is assumed to be a learning model based on a neural network, but may be other types of learning models. The generation model G is assumed to be a generation model based on the neural network, but may be other types of generation models.

(1) Sample Generation Apparatus 1a According to First Example Embodiment

First, the sample generation apparatus 1 according to the first example embodiment (which will be hereinafter referred to as a "sample generation apparatus 1a") will be described.

Figure 1:
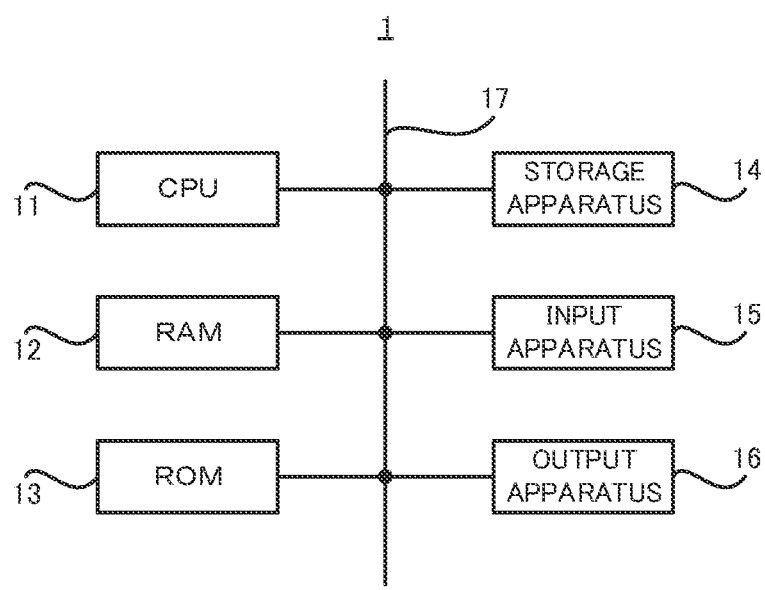
FIG. 1 is a block diagram illustrating a hardware configuration of a model building apparatus according to a first example embodiment.

(1-1) Hardware Configuration of Sample Generation Apparatus 1a According to First Example Embodiment First, with reference to FIG. 1, a hardware configuration of the sample generation apparatus 1a according to the first example embodiment will be described. FIG. 1 is a block diagram illustrating the hardware configuration of the sample generation apparatus 1a according to the first example embodiment.

As illustrated in FIG. 1, the sample generation apparatus 1a includes a CPU (Central Processing Unit) 11, a RAM (Random Access Memory) 12, a ROM (Read Only Memory) 13, a storage apparatus 14, an input apparatus 15, and an output apparatus 16. The CPU 11, the RAM 12, the ROM 13, the storage apparatus 14, the input apparatus 15, and the output apparatus 16 are connected through a data bus 17.

The CPU 11 reads a computer program. For example, the CPU 11 may read a computer program stored by at least one of the RAM 12, the ROM 13 and the storage apparatus 14. For example, the CPU 11 may read a computer program stored in a computer-readable recording medium, by using a not-illustrated recording medium reading apparatus. The CPU 11 may obtain (i.e., read) a computer program from a not illustrated apparatus disposed outside the sample generation apparatus 1*a*, through a network interface. The CPU 11 controls the RAM 12, the storage apparatus 14, the input apparatus 15, and the output apparatus 16 by executing the read computer program. Especially in the first example embodiment, when the CPU 11 executes the read computer program, a logical functional block(s) for generating the adversarial example AX is implemented in the CPU 11. In other words, the CPU 11 is configured to function as a controller for implementing a logical functional block for generating the adversarial example AX. A configuration of the functional block implemented in the CPU 11 will be described in detail later with reference to FIG. 2.

The RAM 12 temporarily stores the computer program to be executed by the CPU 11. The RAM 12 temporarily stores the data that are temporarily used by the CPU 11 when the CPU 11 executes the computer program. The RAM 12 may be, for example, a D-RAM (Dynamic RAM).

The ROM 13 stores a computer program to be executed by the CPU 11. The ROM 13 may otherwise store fixed data. The ROM 13 may be, for example, a P-ROM (Programmable ROM).

The storage apparatus 14 stores the data that are stored for a long term by the sample generation apparatus 1*a*. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the sample generation apparatus 1*a*. The input apparatus 15 may include, for example, at least one of a keyboard, a mouse, and a touch panel.

The output apparatus 16 is an apparatus that outputs information about the sample generation apparatus 1*a*, to the outside. For example, the output apparatus 16 may be a display apparatus that is configured to display the information about the sample generation apparatus 1*a*.

(1-2) Functional Block of CPU 11

Figure 2:
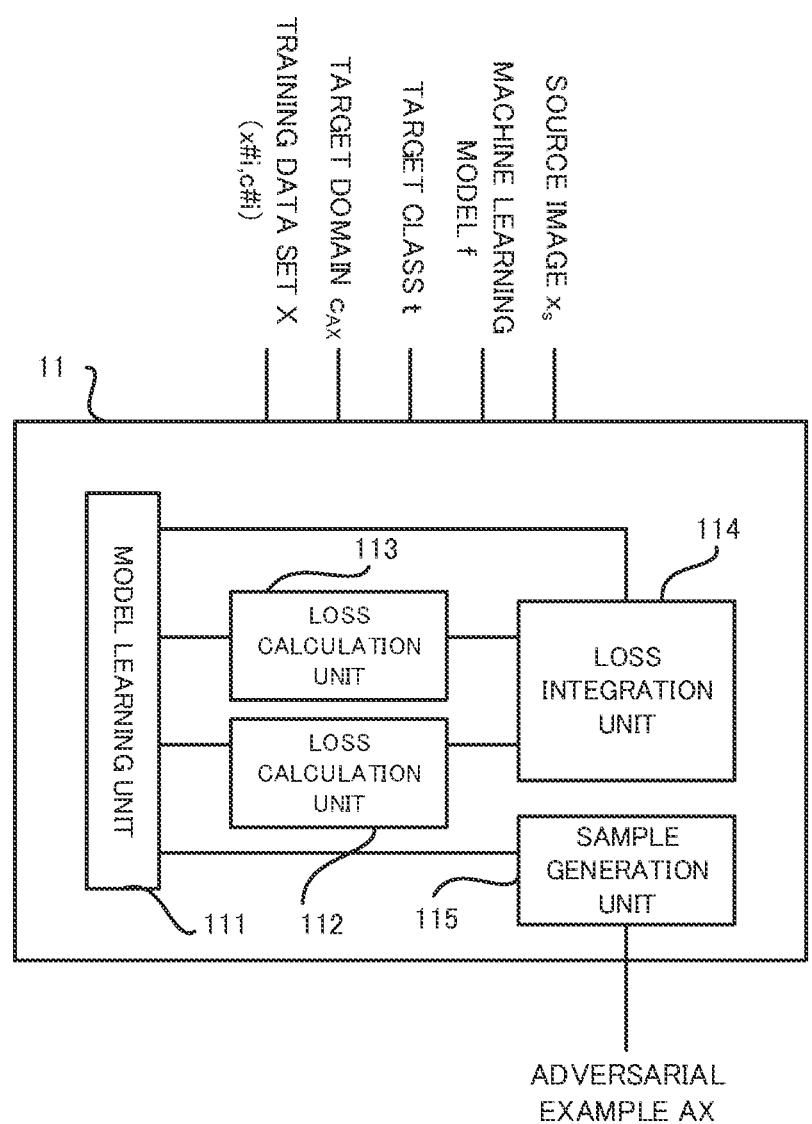
FIG. 2 is a block diagram illustrating a functional block implemented in a CPU according to the first example embodiment.

Next, the functional block implemented in the CPU 11 will be described with reference to FIG. 2. FIG. 2 is a block diagram illustrating the functional block implemented in the CPU 11.

As illustrated in FIG. 2, a model learning unit 111, which is a specific example of the "building unit" in Supplementary Note described later, a loss calculation unit 112, which is a specific example of the "calculating unit" in Supplementary Note described later, a loss calculation unit 113, which is a specific example of the "calculating unit" in Supplementary Note described later, a loss integration unit 114, which is a specific example of the "calculating unit" in Supplementary Note described later, and a sample generation unit 115, which is a specific example of the "generating unit" in Supplementary Note described later, are implemented in the CPU 11 as the logical functional block for generating an adversarial example AX.

The model learning unit 111 builds the generation model G on the basis of the machine learning model f and a target class t. The target class t is information that specifies a class into which an image $x_G$ is classified by the machine learning model f when the image $x_G$ is entered into the machine learning model f, wherein the image $x_G$ is generated by the generation model G (that is, the image $x_G$ is generated so as to function as the adversarial example AX). Therefore, the generation model G built by the model learning unit 111 generates, as the adversarial example AX, the image $x_G$ that causes the machine learning model f to classify the class of the image $x_G$ into the target class t when entered into the machine learning model f.

The model learning unit 111 further refers to a target domain $c_{AX}$ when building the generation model G. The target domain $c_{AX}$ is information indicating the visual feature that the adversarial example AX (i.e., the image $x_G$ generated by the generation model G) should have. In other words, the target domain $c_{AX}$ is information indicating a target visual feature of the adversarial example AX. Although the visual feature in the first example embodiment means the feature that is recognizable by human eyes, but may mean the feature that cannot be recognized by human eyes (but is recognizable by the machine learning model f).

Specifically, the target domain $c_{AX}$ is a domain vector indicating the visual feature that the adversarial example AX has (i.e., should have). For example, the target domain $c_{AX}$ is a domain vector that represents whether or not the adversarial example AX has each of a plurality of visual features by discrete values (e.g., 0 and 1). As an example, when the plurality of visual features include a feature relating to the presence or absence of glasses, a feature relating to the presence or absence of a hat, and a feature relating to the presence or absence of a beard, the target domain $c_{AX}$ is a domain vector containing a value indicating the presence or absence of the glasses, a value indicating the presence or absence of the hat, and a value indicating the presence or absence of the beard. The number of dimensions of the target domain $c_{AX}$ is arbitrary. If the adversarial example AX has each visual feature, a value corresponding to each visual feature may be set to 1. Alternatively, if the adversarial example AX does not have each visual feature, the value corresponding to each visual feature may be set to 0. In this case, in a situation where the adversarial example AX should be an image of a person who is wearing glasses, but not wearing a hat, with no beard, the target domain $c_{AX}$ is a domain vector containing a value "1" indicating wearing glasses, a value "0" indicating no hat, and a value "0" indicating no beard. Therefore, the generation model G built by the model learning unit 111 generates, as the adversarial example AX, the image $xx_G$ that causes the machine learning model f to classify the class of the image $xx_G$ into the target class t when entered into the machine learning model f and that has the visual feature indicated by the target domain $c_{AX}$. In other words, when a source image $x_s$ and the target domain $c_{AX}$ are entered into the generation model G, the model learning unit 111 builds the generation model G that is configured to generate, as the adversarial example AX, the image $x_G$ that causes the machine learning model f to classify the class of the image $x_G$ into the target class t and that has the visual feature indicated by the target domain $c_{AX}$.

In the first example embodiment, the target domain $c_{AX}$ is set to a domain vector that differs from a source domain $c_s$, which is information indicating the visual feature of the source image $x_s$ from which the adversarial example AX is generated. The data structure of the source domain $c_s$ may be the same as the data structure of the target domain $c_{AX}$ (e.g., the data structure that indicates whether or not to have each visual feature by the discrete values). As a result, the generation model G built by the model learning unit 111 generates, as the adversarial example AX, the image $x_G$ that causes the machine learning model f to classify the class of the image $x_G$ into the target class t when entered into the machine learning model f and that has the visual feature that is different from that of the source image $x_s$.

However, the target domain $c_{AX}$ may be set to the same domain vector as that of the source domain $c_s$. In this case, the generation model G built by the model learning unit 111 generates, as the adversarial example AX, the image $x_G$ that causes the machine learning model f to classify the class of the image $x_G$ into the target class t when entered into the machine learning model f and that has the visual feature that is the same as that of the source image $x_s$.

The model learning unit 111 allows the generation model G to learn by using a training data set X such that the generation model G is configured to generate the image $x_G$ that causes the machine learning model f to classify the class of the image $x_G$ into the target class t when entered into the machine learning model f and that has the visual feature indicated by the target domain $c_{AX}$. The training data set X contains N (wherein N is an integer of 1 or more) unit data sets, each of which contains a training sample x and a training domain c. That is, the training data set X contains a first unit data set (x #1, c #1), a second unit data set (x #2, c #2), . . . , an i-th unit data set (x #i, c #i) (wherein i is an integer that satisfies 1≤i≤N), . . . , and an N-th unit data set (x #N, c #N). The training sample x is a sample (i.e., an image) used for the learning by the generation model G. The training domain c is information indicating the visual feature of the corresponding training sample x. That is, the training domain c #i is information indicating the visual feature of the training sample x #i. The data structure of the training domain c may be the same as the data structure of the target domain $c_{AX}$ (e.g., the data structure that indicates whether or not to have each visual feature by the discrete values).

The loss calculation unit 112 calculates a loss value Attribute_G, which is referred to when the model learning unit 111 allows the generation model G to learn. The loss value Attribute_G is a loss value that evaluates the transformation of the visual feature by the generation model G. Specifically, the loss value Attribute_G is a loss value that evaluates whether the visual feature (that is, the actual visual feature) of the image $x_G$ generated by the generation model G is same as or close to the visual feature indicated by the target domain $c_{AX}$ (that is, the target visual feature). That is, the loss value Attribute_G is a loss value that is determined in accordance with a difference between the actual visual feature of the image $x_G$ generated by the generation model G and the target visual feature indicated by the target domain $c_{AX}$. The loss value Attribute_G is, for example, a loss value that is smaller as a difference is smaller between the actual visual feature of the image $x_G$ and the target visual feature indicated by the target domain $c_{AX}$.

In order to calculate the loss value Attribute_G, in the first example embodiment, the loss calculation unit 112 uses, for example, an identification model D_src and a determination model D_cls in addition to the generation model G described above. Each of the identification model D_src and the determination model D_cls shall be a model based on the neural network, but may be other types of models. The loss calculation unit 112 may calculate the loss value Attribute_G in any manner without using the identification model D_src and the determination model D_cls.

The identification model D_src is an identification model for discriminating (i.e., visually distinguishing or differentiating) the image $x_G$ outputted from the generation model G into which one training sample x is entered, from the training sample x contained in the training data set X. The identification model D_src outputs, for example, a probability D_src(x) that the image $x_G$ generated by the generation model G from one training sample x is contained in the training data set X (that is, the probability that the image $x_G$ generated by the generation model G from one training sample x is an image that is the same as or similar to the training sample x).

The determination model D_cls is a determination model for determining whether or not the image $x_G$ outputted from the generation model G into which one training sample x is entered has the visual feature indicated by the target domain $c_{AX}$. The determination model D_cls outputs, for example, a probability D_cls $(x, c_{AX})$ that the image $x_G$ generated by the generation model G from one training sample x has the visual feature indicated by the target domain $c_{AX}$.

The loss calculation unit 112 calculates the loss value Attribute_G on the basis of the training sample x, the training domain c and the target domain $c_{AX}$. For example, the loss calculation unit 112 may calculate the loss value Attribute_G by using a loss function Attribute_G $(x, c, c_{AX})$ given by Equation 1 below that uses the training sample x, the training domain c, and the target domain $c_{AX}$ as arguments. Functions L1, L2 and L3 in Equation 1 are functions given by Equation 2 to Equation 4, respectively. Each of variables $\beta_1$ and $\beta_2$ in Equation 1 is a positive number. Each of the variables $\beta_1$ and $\beta_2$ in Equation 1 may be a variable unique to the sample generation apparatus 1a, or may be a variable externally specified through the input apparatus 15. "G(x, $c_{AX}$)" in Equation 2 indicates the image $x_G$ (i.e., the adversarial example AX) generated by the generation model G into which the training sample x and the target domain $c_{AX}$ are entered.

$$\text{Attribute } G = \text{Attribute } G(x,c,c_{AX}) = L1(x,c_{AX}) + \beta_1 L2(x,c_{AX}) + \beta_2 L3(x,c,c_{AX}) \quad \text{[Equation 1]}$$

$$L1(x,c_{AX}) = \log(D\_src(x)) + \log(1 - D\_src(G(x,c_{AX}))) \quad \text{[Equation 2]}$$

$$L2(x,c_{AX}) = -\log(D\_cls(G(x,c_{AX}),c_{AX})) \quad \text{[Equation 3]}$$

$$L3(x,c,c_{AX}) = \|x - G(G(x,c_{AX}),c)\|_1 \quad \text{[Equation 4]}$$

The loss calculation unit 113 calculates a loss value Attack, which is referred to when the model learning unit 111 allows the generation model G to learn. The loss value Attack is a loss value that evaluates whether or not the image $x_G$ generated by the generation model G can function as the adversarial example AX. That is, the loss value Attack is a loss value that evaluates whether or not the image $x_G$ generated by the generation model G causes the misclassification by the machine learning model f. The loss value Attack is, for example, a loss value that is smaller as there is a higher possibility that the image $x_G$ generated by the generation model G functions as the adversarial example AX. The loss value Attack is, for example, a loss value that is smaller as there is a higher possibility that the image $x_G$ generated by the generation model G causes the misclassification by the machine learning model f.

More specifically, the generation model G generates the image $x_G$ such that the class of the image $x_G$ generated by the generation model G is classified into the target class t by the machine learning model f. Therefore, the loss value Attack may be a loss value that evaluates whether or not the class of the image $x_G$ generated by the generation model G is classified into the target class t by the machine learning model f. That is, the loss value Attack may be a loss value that evaluates whether or not the output of the machine learning model f into which the image $x_G$ generated by the generation model G is entered matches the target class t. The loss value Attack may be a loss value that is smaller as there is a higher possibility that the class of the image $x_G$ generated by the generation model G is classified into the target class t by the machine learning model f. The loss value Attack may be a loss value that is smaller as there is a higher possibility that the output of the machine learning model f into which the image $x_G$ generated by the generation model G is entered matches the target class t.

The loss calculation unit 113 calculates the loss value Attack on the basis of the training sample x, the machine learning model f (especially, a parameter for defining the machine learning model f), and the target class t. For example, the loss calculation unit 113 may calculate the loss value Attack by using a loss function Attack (x, f, t) given by Equation 5 below that uses the training sample x, the machine learning model f (especially, the parameter for defining the machine learning model f), and the target class t as arguments. A function f (a, b) in Equation 5 indicates the value of a logit function corresponding to a class b into which a certain sample a is classified when the sample a is entered into the machine learning model f. Accordingly, a function f (G(x), l) indicates the value of the logit function corresponding to a class l when the image $x_G$ (=G(x)) outputted from the generation model G into which the training sample x is entered is entered into the machine learning model f. A function F(G(x), t) indicates the value of the logit function corresponding to the class t when the image $x_G$ (=G(x)) outputted from the generation model G into which the training sample x is entered is entered into the machine learning model f. When the machine learning model f is a learning model based on the neural network, the parameter of the machine learning model f may include the parameter of the neural network. The parameter of the neural network may include, for example, at least one of weighting and bias at each node. The loss calculation unit 113 may calculate the loss value Attack in any manner.

$$\text{Attack}(x, f, t) = \underset{l:l \ne t}{\text{argmax}}(f(G(x), l)) - f(G(x), t) \quad \text{[Equation 5]}$$

The loss value Attack defined by Equation 5 is a negative value when the output of the machine learning model f into which the image $x_G$ generated by the generation model G is entered matches the target class t.

The model learning unit 111 updates the generation model G, by allowing the generation model G generated by the model learning unit 111 to learn by using a loss value Loss_G based on the loss value Attribute_G calculated by the loss calculation unit 112 and the loss value Attack calculated by the loss calculation unit 113. The loss value Loss_G is a loss value that is smaller as each of the loss value Attribute_G and the loss value Attack is smaller.

In order to calculate the loss value Loss_G, the loss calculation unit 112 calculates the loss value Attribute_G for all the training samples x contained in the training data set X. Furthermore, the loss calculation unit 113 calculates the loss value Attack for all the training samples x included in the training data set X. The loss calculation unit 112 may calculate the loss value Attribute_G for a part of all the training samples x contained in the training data set X. Furthermore, the loss calculation unit 113 may calculate the loss value Attack for a part of all the training samples x contained in the training data set X. Then, the loss integration unit 114 calculates the loss value Loss_G on the basis of the loss value Attribute_G and the loss value Attack. For example, the loss integration unit 114 may calculate the loss value Loss_G by using a loss function Loss_G (X, $c_{AX}$, f, t) given by Equation 6 below that uses the loss value Attribute_G and the loss value Attack as arguments. A variable "α" in Equation 6 is a variable indicating which the loss value Attribute_G and the loss value Attack is prioritized when the loss value Loss_G is calculated. As the variable α is larger, the loss value Attack is prioritized more. The variable α may be a variable unique to the sample generation apparatus 1a, or may be a variable externally specified through the input apparatus 15.

$$\text{Loss\_G} = \text{Loss\_G}(X, c_{AX}, f, t) = \quad \text{[Equation 6]}$$
$$\frac{1}{N} \sum_{(x\#i, c\#i \in X)} (\text{Attribute\_G}(x\#i, c\#i, c_{AX}) + \alpha \text{Attack}(x\#i, f, t))$$

Then, the model learning unit 111 updates the generation model G by allowing the generation model G to learn on the basis of the loss value Loss_G. For example, the model learning unit 111 allows the generation model G to learn such that the loss value Loss_G is smaller. As described above, the loss value Loss_G is a loss value that is smaller as each of the loss value Attribute_G and the loss value Attack is smaller. Therefore, an operation of allowing the generation model G to learn such that the loss value Loss_G is smaller is equivalent to an operation of allowing the generation model G to learn such that both the loss value Attribute_G and the loss value Attack are smaller (or, such that one of the loss value Attribute_G and the loss value Attack is smaller). At this time, the model learning unit 111 may allow the generation model G to learn by using an arbitrary algorithm. For example, the model learning unit 111 may allow the generation model G to learn by using an error back propagation method.

The model learning unit 111 repeatedly allows the generation model G to learn such that the generation model G is updated a desired number of times or more. As a result, the model learning unit 111 is allowed to build the generation model G that is configured to generate, as the adversarial example AX, the image $x_G$ that causes the machine learning model f to classify the class of the image $x_G$ into the target class t and that has the visual feature indicated by the target domain $c_{AX}$ when the source image $x_s$ and the target domain $c_{AX}$ are entered. That is, the model learning unit 111 is allowed to build the generation model G that is configured to generate the image $x_G$ that has the visual feature indicated by the target domain $c_{AX}$ and that can function as the adversarial example AX when the source image $x_s$ and the target domain $c_{AX}$ are entered.

The model learning unit 111 outputs the built generation model G (that is, the generation model G updated the desired number of times or more) to the sample generation unit 115. The sample generation unit 115 generates the adversarial example AX by using the source image $x_s$ and the generation model G built by the model learning unit 111. Specifically, the sample generation unit 115 enters the source image $x_s$ and the target domain $c_{AX}$ into the generation model G, thereby to generate the adversarial example AX that is the output of the generation model G.

The model learning unit 111 may further update the identification model D_src and the determination model D_cls used to calculate the loss value Loss_G by allowing them to learn. More specifically, the model learning unit 111 may allow the identification model D_src and the determination model D_cls to learn such that the generation model G can generate the image $x_G$ that causes the machine learning model f to classify the class of the image $x_G$ into the target class t and that has the visual feature indicated by the target domain $c_{AX}$. As a result, in comparison with a situation where an operation of allowing the identification model D_src and the determination model D_cls to learn is not performed, the model learning unit 111 is allowed to build the generation model G that is configured to generate the image $x_G$ that has the visual feature indicated by the target domain $c_{AX}$ more appropriately and that can function as the adversarial example AX more appropriately. At this time, in order to enhance a learning effect, the model learning unit 111 may alternately repeat the operation of allowing the generation model G to learn and the operation of allowing the identification model D_src and the determination model D_cls to learn.

When the identification model D_src and the determination model D_cls are allowed to learn, the loss calculation unit 112 calculates a loss value Attribute_D, which is referred to when the identification model D_src and the determination model D_cls are allowed to learn. The loss value Attribute_D is a loss value that evaluates the transformation of the visual feature by the generation model G, as in the loss value Attribute_G described above. Therefore, the loss value Attribute_D may have the same feature as that of the loss value Attribute_G described above, and a detailed description thereof will be thus omitted. The loss calculation unit 112 may calculate the loss value Attribute_D in any manner without using the identification model D_src and the determination model D_cls.

The loss calculation unit 112 calculates the loss value Attribute_D on the basis of the training sample x, the training domain c and the target domain $c_{AX}$. For example, the loss calculation unit 112 may calculate the loss value Attribute_D by using a loss function Attribute_D (x, c, $c_{AX}$) given by Equation 5 below that uses the training sample x, the training domain c, and the target domain $c_{AX}$ as arguments. A function L4 in Equation 7 is a function given by Equation 8. "$\beta_3$" in Equation 8 is a positive number. "β3" in Equation 5 may be a variable unique to the sample generation apparatus 1a, or may be a variable externally specified through the input apparatus 15.

Attribute $D$=Attribute $D(x,c,c_{AX})$=−$L1(x,c_{AX})$+$\beta_3$ $L4(x,c)$ [Equation 7]

$L4(x,c)$=−$\log(D\_cls(x,c))$ [Equation 8]

The model learning unit 111 allows the identification model D_src and the determination model D_cls to learn by using a loss value Loss_D based on the loss value Attribute_D calculated by the loss calculation unit 112. The loss value Loss_D is a loss value that is smaller as the loss value Attribute_D is smaller.

In order to calculate the loss value Loss_D, the loss calculation unit 112 calculates the loss value Attribute_D for all the training samples x contained in the training data set X. The loss calculation unit 112 may calculate the loss value Attribute_D for a part of all the training samples x contained in the training data set X. Then, the loss integration unit 114 calculates the loss value Loss_D on the basis of the loss value Attribute_D. For example, the loss integration unit 114 may calculate the loss value Loss_D by using a loss function Loss_D (X, $c_{AX}$) given by Equation 9 below that uses the loss value Attribute_D as an argument. A variable "α" in Equation 6 is a variable indicating on which of the loss value Attribute_G and the loss value Attack emphasis is placed when the loss value Loss_G is calculated. As the variable α is larger, emphasis is placed more on the loss value Attack. The variable α may be a variable unique to the sample generation apparatus 1a, or may be a variable externally specified through the input apparatus 15.

$$Loss_D =$$ [Equation 9]
$$Loss_D(X, c_{AX}) = \frac{1}{N} \sum_{(x\#i, c\#i \in X)} (\text{Attribute\_D}(x\#i, c\#i, c_{AX}))$$

Then, the model learning unit 111 updates the identification model D_src and the determination model D_cls by allowing the identification model D_src and the determination model D_cls to learn on the basis of the loss value Loss_D. For example, the model learning unit 111 allows the identification model D_src and the determination model D_cls to learn such that the loss value Loss_D is smaller. As described above, the loss value Loss_D is a loss value that is smaller as the loss value Attribute_D is smaller. Therefore, an operation of allowing the identification model D_src and the determination model D_cls to learn such that the loss value Loss_D is smaller is equivalent to an operation of allowing the identification model D_src and the determination model D_cls to learn such that the loss value Attribute_D is smaller. At this time, the model learning unit 111 may allow the identification model D_src and the determination model D_cls to learn by using an arbitrary algorithm. For example, the model learning unit 111 may allow the identification model D_src and the determination model D_cls to learn by using the error back propagation method.

(1-3) Flow of Operations of Sample Generation Apparatus 1a

Figure 3:
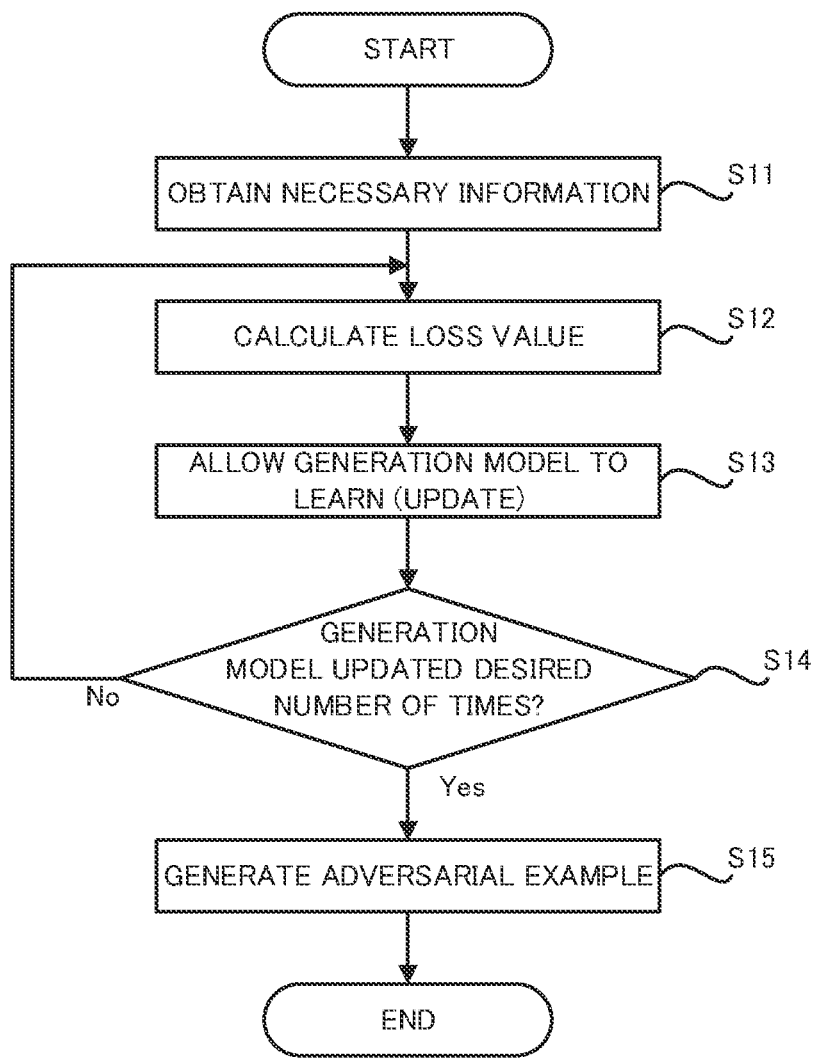
FIG. 3 is a flow chart illustrating a flow of operations of the model building apparatus according to the first example embodiment.

Next, with reference to FIG. 3, a flow of operations of the sample generation apparatus 1a according to the first example embodiment (that is, the operations of building the generation model G and generating the adversarial example AX based on the built generation model G) will be described. FIG. 3 is a flow chart illustrating the flow of the operations of the sample generation apparatus 1a according to the first example embodiment.

As illustrated in FIG. 3, the sample generation apparatus 1a (especially, the CPU 11) obtains information required to generate the adversarial example AX (step S11). Specifically, the sample generation apparatus 1a obtains information relating to the machine learning model f (especially, its parameter) described above, the source image $x_s$, information relating to the target class t, the training data set X and information relating to the target domain $c_{AX}$. The sample generation apparatus 1a may obtain at least a part of these information stored in the storage apparatus 14 (or a computer-readable recording medium). The sample generation apparatus 1a may obtain at least a part of these information from a not-illustrated apparatus disposed outside the sample generation apparatus 1a, through a network interface. The sample generation apparatus 1a may obtain at least a part of these information through the input apparatus 15.

Then, the model learning unit 111 controls the loss calculation unit 112, the loss calculation unit 113, and the loss integration unit 114 so as to calculate the loss value Loss_G (step S12). Then, the model learning unit 111 allows the generation model G to learn (that is, update the generation model G) on the basis of the loss value Loss_G calculated in the step S12 (step S13).

The model learning unit 111 repeats the process of the step S12 and the step S13 the desired number of times (step S14). In other words, the model learning unit 111 updates the generation model G the desired number of times (step S14).

After the generation model G is updated the desired number of times (step S14: Yes), the model learning unit 111 outputs the built generation model G to the sample generation unit 115. The sample generation unit 115 generates the adversarial example AX by using the source image $x_s$ and the generation model G built by the model learning unit 111 (step S15).

(1-4) Technical Effect of Sample Generation Apparatus 1a

As described above, the sample generation apparatus 1a according to the first example embodiment is allowed to generate the generation model G. Especially, the sample generation apparatus 1a is allowed to update the generation model G by using the loss value Attribute_G. For this reason, the sample generation apparatus 1a is allowed to build the generation model G that is configured to generate the adversarial example AX with the visual feature indicated by the target domain $c_{AX}$. Here, since the target domain $c_{AX}$ differs from the source domain $c_s$ of the source image $x_s$, the sample generation apparatus 1a is allowed to build the generation model G that is configured to generate the adversarial example AX with different visual feature from that of the source image $x_s$. Therefore, the sample generation apparatus 1a is allowed to easily generate the adversarial example AX with different visual feature from that of the source image $x_s$, by using such a generation model G.

(2) Sample Generation Apparatus 1b According to Second Example Embodiment

Next, a sample generation apparatus 1 according to a second example embodiment (which will be hereinafter referred to as a "sample generation apparatus 1b") will be described.

Figure 4:
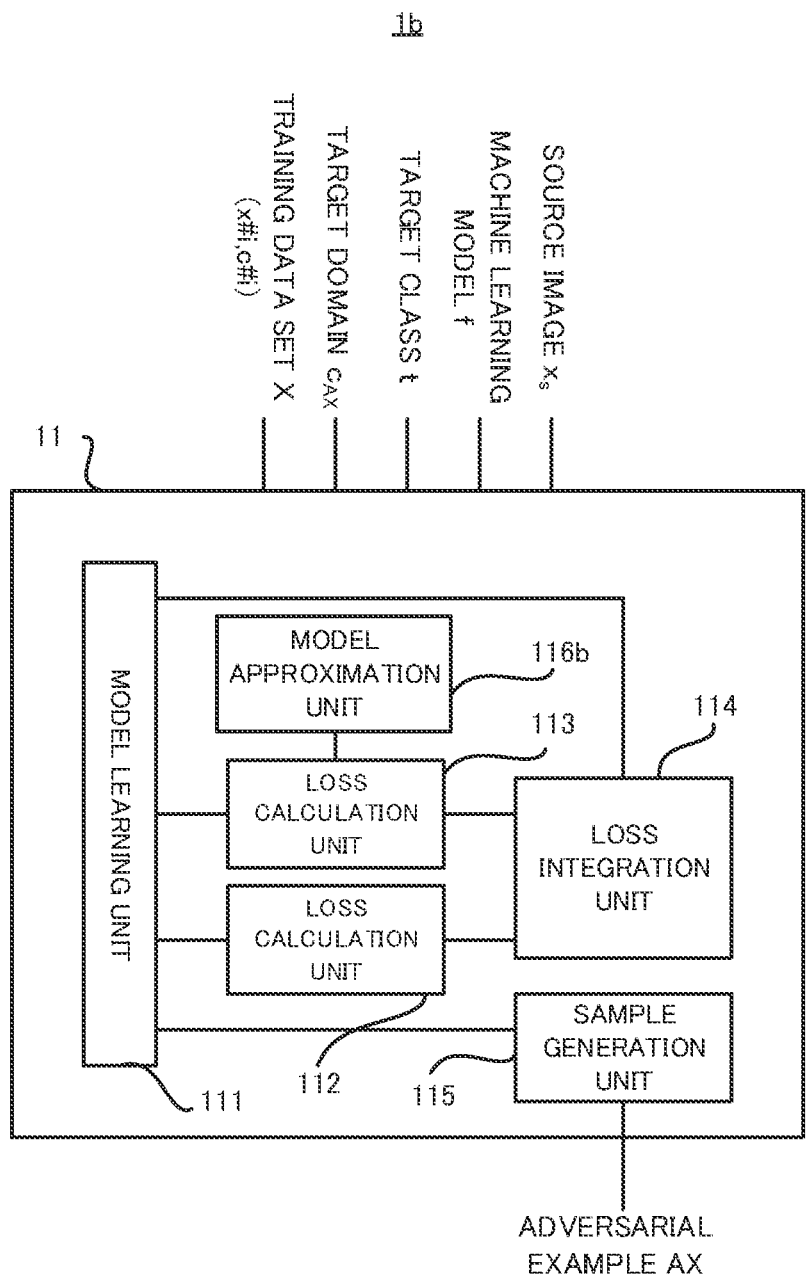
FIG. 4 is a block diagram illustrating a functional block implemented in a CPU according to a second example embodiment.

(2-1) Configuration of Sample Generation Apparatus 1b According to Second Example Embodiment The sample generation apparatus 1b according to the second example embodiment differs from the sample generation apparatus 1a according to the first example embodiment described above, in that it has a different functional block that is implemented in the CPU 11. Other features of the sample generation apparatus 1b according to the second example embodiment may be the same as those of the sample generation apparatus 1a according to the first example embodiment described above. Therefore, the functional block implemented in the CPU 11 according to the second example embodiment will be described below with reference to FIG. 4. FIG. 4 is a block diagram illustrating the functional block implemented in the CPU 11 according to the second example embodiment. Hereinafter, the same constituent components as those already described will be denoted by the same reference numerals, and the detailed description thereof will be omitted.

As illustrated in FIG. 4, the sample generation apparatus 1b differs from the sample generation apparatus 1a in that a model approximation unit 116b is implemented in the CPU 11 as the logical functional block for generating the adversarial example AX. The model approximation unit 116b is a specific example of the "approximating unit" in Supplementary Note described later. Other features of the functional block of the sample generation apparatus 1b may be the same as those of the sample generation apparatus 1a.

The model approximation unit 116b builds an approximate learning model f' that approximates the machine learning model f. The approximate learning model f' is assumed to be a learning model based on a neural network, but may be other types of learning models.

The model approximation unit 116b builds the approximate learning model f' on the basis of the training data set X and at least one of the machine learning model f and the generation model G. Specifically, a unit data set that contains: each training sample x contained in the training data set X; and an output information (i.e., an image) obtained by entering each training sample x into the machine learning model f, is available as a learning data set for building the approximate learning model f'. It is because this unit data set is a data set in which the output information, which is the output of the machine learning model f, is associated as a correct answer label with the training sample x, which is the input of the machine learning model f.

Similarly, a unit data set that contains: the image $x_G$ obtained by entering each training sample x contained in the training data set X into the generation model G and an output information (that is, an image) obtained by entering the image $x_G$ into the machine learning model f, is also available as the learning data set for building the approximate learning model f'. It is because this unit data set is a data set in which the output information, which is the output of the machine learning model f, is associated as a correct answer label with the image $x_G$, which is the entry or input of the machine learning model f.

Therefore, the model approximation unit 116b first generates the learning data set in order to build the approximate learning model f'. Specifically, the model approximation unit 116b may enter all the training samples x contained in the training data set X into the machine learning model f in order, thereby to generate a learning data set containing a plurality of unit data sets, each of which contains the training sample x and an output information (that is, an image) obtained by entering the training sample x into the machine learning model f. The model approximation unit 116b may obtain a plurality of images $x_G$, each of which is obtained by entering all the training sample x contained in the training data set X into the generation model G, and then may enter the plurality of images $x_G$ into the machine learning model f in order, thereby to generate a learning data set containing a plurality of unit data sets, each of which contains the image $x_G$, and an output information (that is, an image) obtained by entering the image $x_G$ into the machine learning model f. The model approximation unit 116b may generate the learning data set by using a part of all the training samples x contained in the training data set X.

Then, the model approximation unit 116b builds the approximate learning model f' by using the generated learning data set. That is, the model approximation unit 116b builds the approximate learning model f' by allowing the approximate learning model f' to learn (that is, update the approximate learning model f') by using the learning data set. At this time, the model approximation unit 116b may allow the approximate learning model f' to learn by using an arbitrary loss value (that is, a loss function). For example, the model approximation unit 116b may use a cross entropy loss function to allow the approximate learning model f' to learn. Furthermore, the model approximation unit 116b may use an arbitrary algorithm to allow the approximate learning model f' to learn. For example, the model approximation unit 116b may allow the approximate learning model f' to learn by using the error back propagation method.

The model approximation unit 116b may allow the approximate learning model f' to learn in arbitrary timing. For example, the model approximation unit 116b may allow the approximate learning model f' to learn such that the approximate learning model f' is updated every time the generation model G is updated. Furthermore, the model approximation unit 116b may allow the approximate learning model f' to learn such that the approximate learning model f' is updated a desired number of times every time the approximate learning model f' is allowed to learn.

The approximate learning model f' may be used in place of the machine learning model f when the loss value Attack (see Equation 5 described above) is calculated. In other words, the loss calculation unit 113 may calculate the loss value Attack by using one of the approximate learning model f' and the machine learning model f. For example, as described above, in order to calculate the loss value Attack, the parameter for defining the machine learning model f is used. However, the parameter for defining the machine learning model f is not necessarily known information to the sample generation apparatus 1b. That is, the parameter for defining the machine learning model f may be unknown information (i.e., black boxes) to the sample generation apparatus 1b. In this case, it is hard for the loss calculation unit 113 to calculate the loss value Attack by using the parameter for defining the machine learning model f. Therefore, when the parameter for defining the machine learning model f is not the known information, the model approximation unit 116b may build the approximate learning model f', and the loss calculation unit 113 may calculate the loss value Attack on the basis of the approximate learning model f' (especially, its parameter). On the other hand, when the parameter for defining the machine learning model f is the known information, the loss calculation unit 113 may calculate the loss value Attack on the basis of the machine learning model f (especially, its parameter). When the parameter for defining the machine learning model f is the known information, the model approximation unit 116b may not build the approximate learning model f'.

(2-2) Flow of Operations of Sample Generation Apparatus 1b

Figure 5:
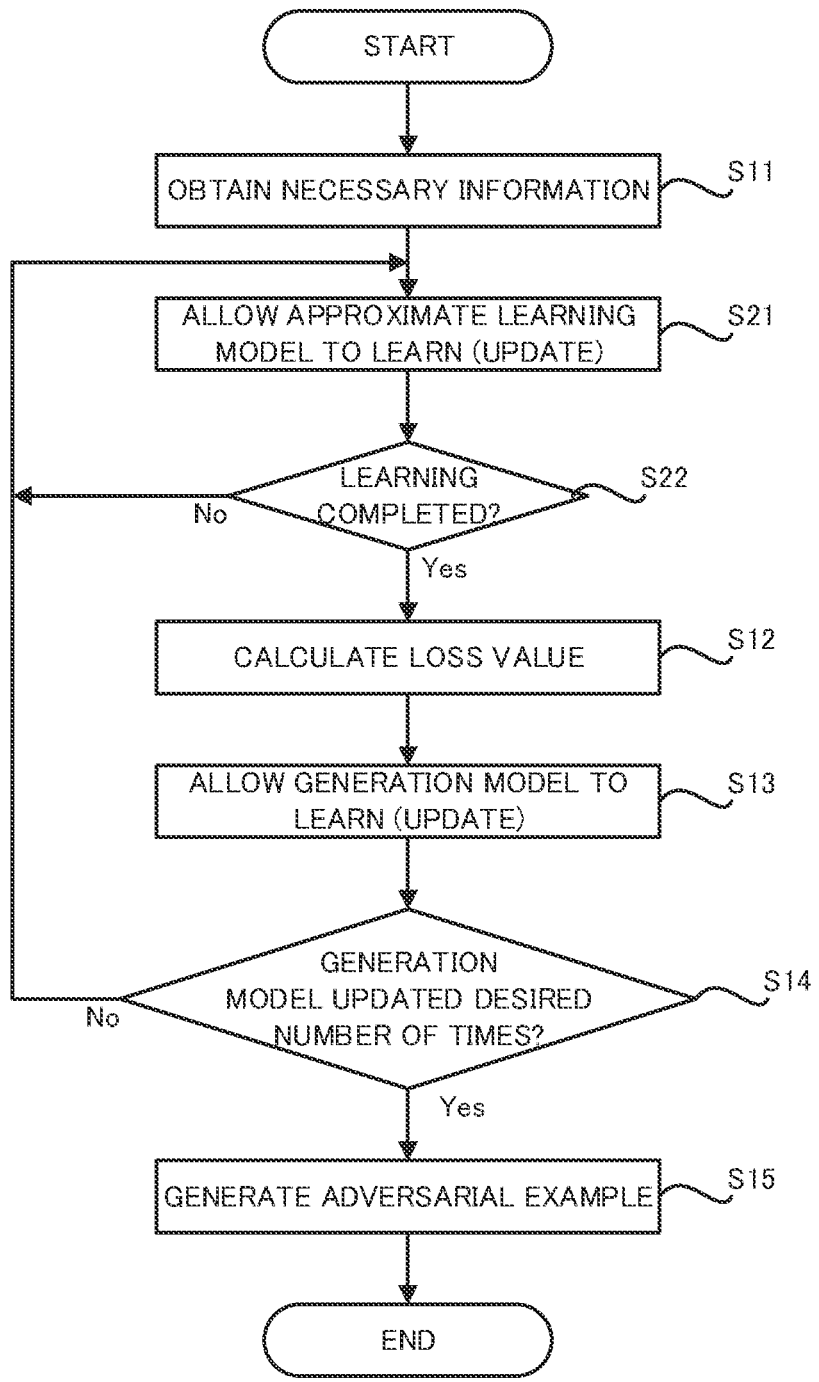
FIG. 5 is a flow chart illustrating a flow of operations of a model building apparatus according to the second example embodiment.

Next, with reference to FIG. 5, a flow of operations of the sample generation apparatus 1b according to the second example embodiment (that is, operations of building the generation model G and of generating the adversarial example AX on the basis of the built generation model G) will be described. FIG. 5 is a flow chart illustrating the flow of the operations of the sample generation apparatus 1b according to the second example embodiment. Hereinafter, the same steps as those already described will be denoted by the same step numbers, and detailed descriptions thereof will be omitted.

As illustrated in FIG. 5, the sample generation apparatus 1b (especially, the CPU 11) obtains the information required to generate the adversarial example AX (the step S11).

Then, the model approximation unit 116b builds the approximate learning model f' (step S21). That is, as described above, the model approximation unit 116b builds the approximate learning model f' by allowing the approximate learning model f' to learn (that is, update the approximate learning model f') by using the learning data set (step S21). The learning by the approximate learning model f' is repeated until an end condition for ending the learning by the approximate learning model f' (for example, the condition that the approximate learning model f' is updated the desired number of times) is satisfied (step S22).

Then, after the learning by the approximate learning model f' is completed (the step S22: Yes), the model learning unit 111 allows the generation model G to learn (that is, update the generation model G) by performing the step S12 to the step S14 described above. Until the generation model G is updated the desired number of times (the step S14: No), every time the generation model G is updated, the learning by the approximate learning model f' (the step S21 to the step S22) and the learning by the generation model G (the step S12 to the step S13) are repeated. In other words, FIG. 5 illustrates an example in which the learning by the approximate learning model f' is performed every time the generation model G is updated. After the generation model G is updated the desired number of times, the sample generation unit 115 generates the adverse sample AX (the step S15).

(2-3) Technical Effect of Sample Generation Apparatus 1b

The sample generation apparatus 1b according to the second example embodiment can enjoy the same effect as that of the sample generation apparatus 1a according to the first example embodiment. Furthermore, in the sample generation apparatus 1b, since the model approximation unit 116b is configured to generate the approximate learning model f', the generation model G can be built even when the parameter of the machine learning model f is not the known information.

(3) Sample Generation Apparatus 1c According to Third Example Embodiment

Next, the sample generation apparatus 1 according to a third example embodiment (which will be hereinafter referred to as a "sample generation apparatus 1c") will be described.

Figure 6:
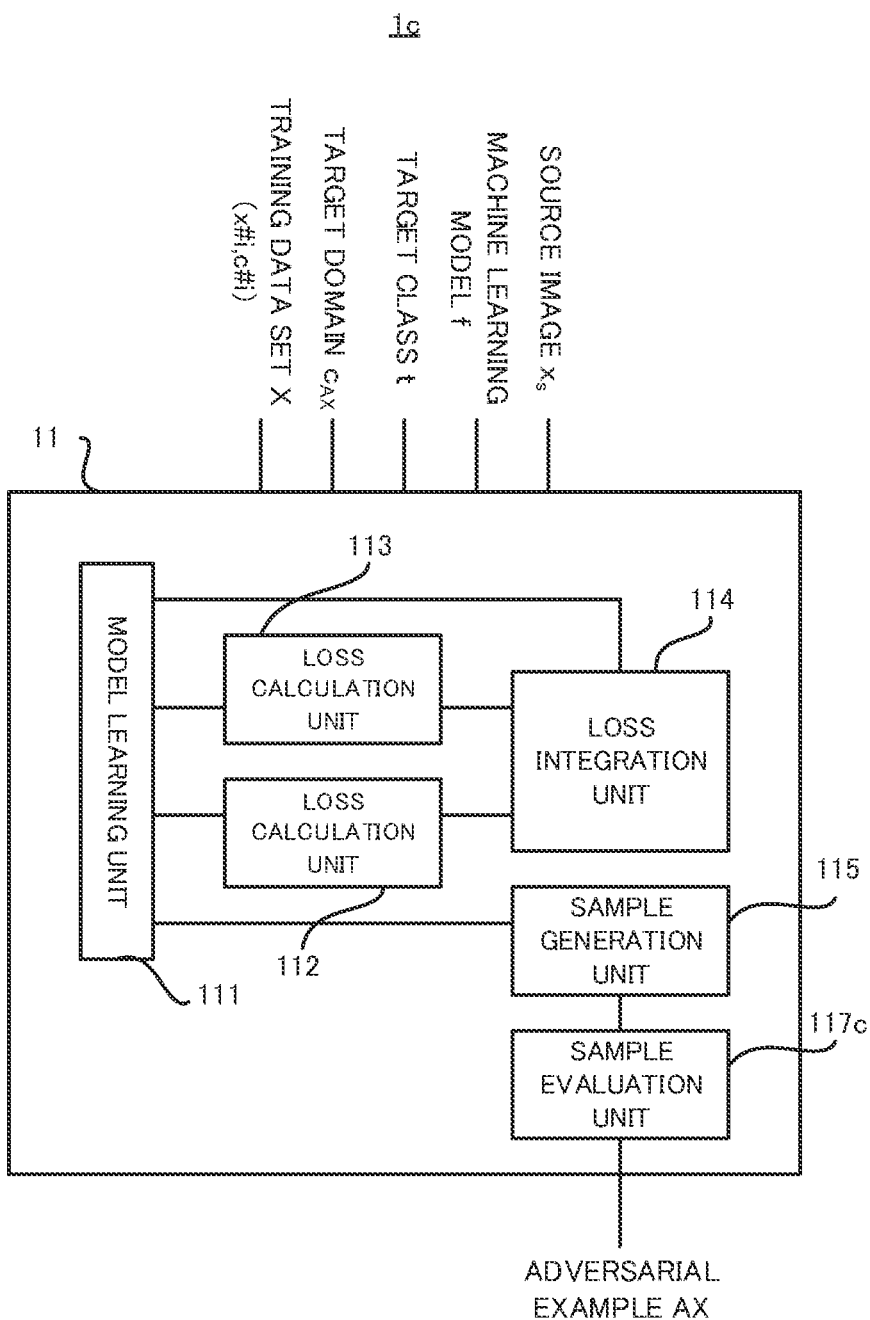
FIG. 6 is a block diagram illustrating a functional block implemented in a CPU according to a third example embodiment.

(3-1) Configuration of Sample Generation Apparatus 1c According to Third Example Embodiment The sample generation apparatus 1c according to the third example embodiment differs from the sample generation apparatus 1a according to the first example embodiment described above or the sample generation apparatus 1b according to the second example embodiment, in that it has a different functional block that is implemented in the CPU 11. Other features of the sample generation apparatus 1c according to the third example embodiment may be the same as those of the sample generation apparatus 1a according to the first example embodiment or the sample generation apparatus 1b according to the second example embodiment described above. Therefore, the functional block implemented in the CPU 11 according to the third example embodiment will be described below with reference to FIG. 6. FIG. 6 is a block diagram illustrating the functional block implemented in the CPU 11 according to the third example embodiment.

As illustrated in FIG. 6, the sample generation apparatus 1c differs from the sample generation apparatus 1a or 1b in that a sample evaluation unit 117c is implemented in the CPU 11 as the logical functional block for generating the adversarial example AX. The sample evaluation unit 117c is a specific example of the "evaluating unit" in the Supplementary Note described later. Other features of the functional block of the sample generation apparatus 1c may be the same as those of the sample generation apparatus 1a or 1b.

The sample evaluation unit 117c evaluates the adversarial example AX generated by the sample generation unit 115. Specifically, the sample evaluation unit 117c evaluates whether or not the adversarial example AX generated by the sample generation unit 115 causes the misclassification by the machine learning model f. That is, the sample evaluation unit 117c evaluates whether or not the machine learning model f classifies the class of the adversarial example AX into the target class t when the adversarial example AX generated by the sample generation unit 115 is entered into the machine learning model f. When the sample evaluation unit 117c evaluates that the machine learning model f classifies the class of the adversarial example AX into the target class t, the sample evaluation unit 117c may evaluate that the adversarial example AX generated by the sample generation unit 115 is an appropriate sample that causes the misclassification by the machine learning model f. On the other hand, when the sample evaluation unit 117c evaluates that the machine learning model f does not classify the class of the adversarial example AX into the target class t, the sample evaluation unit 117c may evaluate that the adversarial example AX generated by the sample generation unit 115 is a sample that may not cause the misclassification by the machine learning model f (that is, a sample that may not be appropriate).

(3-2) Flow of Operations of Sample Generation Apparatus 1c

Figure 7:
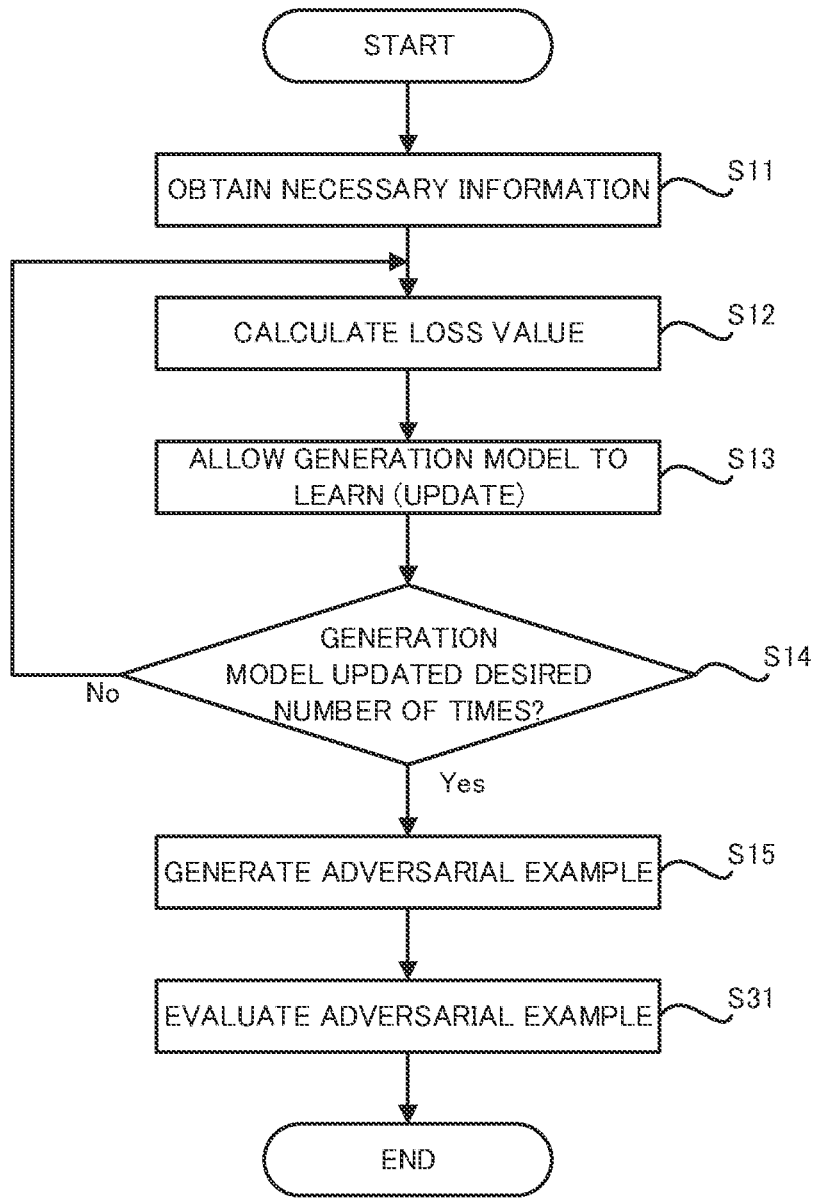
FIG. 7 is a flow chart illustrating a flow of operations of a model building apparatus according to the third example embodiment.

Next, with reference to FIG. 7, a flow of operations of the sample generation apparatus 1c according to the third example embodiment (that is, the operations of building the generation model G and of generating the adversarial example AX on the basis of the built generation model G) will be described. FIG. 7 is a flowchart illustrating the flow of the operations of the sample generation apparatus 1c according to the third example embodiment.

As illustrated in FIG. 7, even in the third example embodiment, similarly to the first example embodiment, the adversarial example AX is generated by performing the step S11 to the step S15. Alternatively, even in the third example embodiment, similarly to the second example embodiment, the adversarial example AX is generated by performing the step S11 to step S15 and the step S21 to the step S22.

After the adversarial example AX is generated, the sample evaluation unit 117c evaluates the adversarial example AX generated by the sample generation unit 115 (step S31). A result of the evaluation of the adversarial example AX may be outputted by the output apparatus 16. When the adversarial example AX is evaluated to be a sample that may not be appropriate, the generated model G may not be a model that is configured to generate the appropriate adversarial example AX. Therefore, when the adversarial example AX is evaluated to be a sample that may not be appropriate, the model learning unit 111 may perform the step S11 and the subsequent steps again, thereby to further update the generation model G. The model learning unit 111 may further update the generation model G by repeating the step S11 and the subsequent steps until the adversarial example AX is evaluated to be an appropriate sample.

(3-3) Technical Effect of Sample Generation Apparatus 1c

The sample generation apparatus 1c according to the third example embodiment can enjoy the same effect as that of the sample generation apparatus 1a according to the first example embodiment or the sample generation apparatus 1b according to the second example embodiment. Furthermore, in the sample generation apparatus 1c, the sample evaluation unit 117c is configured to evaluate whether or not the adversarial example AX is appropriate. Consequently, the sample generation apparatus 1c is substantially allowed to evaluate whether or not the generation model G is appropriate.

(4) Modified Example

Figure 8:
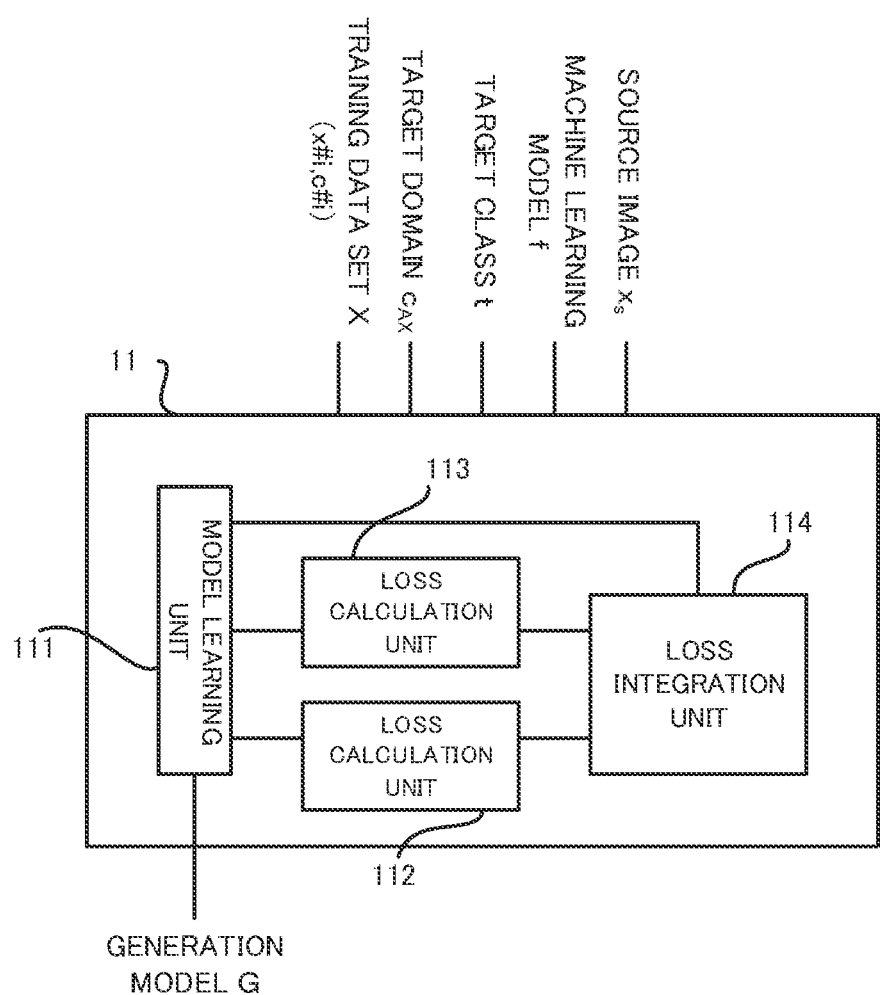
FIG. 8 is a block diagram illustrating a modified example of the functional block implemented in the CPU.

In the above-described description, the sample generation apparatus 1 includes the sample generation unit 111. The sample generation apparatus 1, however, may not include the sample generation unit 111, as illustrated in FIG. 8. In other words, the sample generation apparatus 1 may function as an apparatus that builds the generation model G, but that does not generate the adversarial example AX. In this case, the sample generation apparatus 1 may be referred to as a model building apparatus that builds the generation model G. The sample generation apparatus 1 may output the built generation model G to an apparatus that is different from the sample generation apparatus 1. In this case, the apparatus that is different from the sample generation apparatus 1 may generate the adversarial example AX by using the generation model G built by the sample generation apparatus 1.

(5) Supplementary Note

With respect to the example embodiments described above, the following Supplementary Notes will be further disclosed.

(5-1) Supplementary Note 1

A model building apparatus described in Supplementary Note 1 is a model building apparatus including: a building unit that builds a generation model that outputs an adversarial example, which causes misclassification by a learned model, when a source sample is entered into the generation model; and a calculating unit that calculates a first evaluation value and a second evaluation value, wherein the first evaluation value is smaller as a difference is smaller between an actual visual feature of the adversarial example outputted from the generation model and a target visual feature of the adversarial example, which are set to be different from a visual feature of the source sample, and the second evaluation value is smaller as there is a higher possibility that the learned model misclassifies the adversarial example outputted from the generation model, wherein the building unit builds the generation model by updating the generation model such that an index value based on the first and second evaluation values is smaller.

(5-2) Supplementary Note 2

A model building apparatus described in Supplementary Note 2 is the model building apparatus described in Supplementary Note 1, wherein the model building apparatus further includes an approximating unit that generates an approximate model for approximating the learned model, and the calculating unit calculates the second evaluation value on the basis of a parameter for defining the approximate model.

A model building apparatus described in Supplementary Note 3 is the model building apparatus described in Supplementary Note 2, wherein the calculating unit (i) calculates the second evaluation value on the basis of a parameter for defining the learned model when it is possible to obtain the parameter for defining the learned model, and (ii) calculates the second evaluation value on the basis of the parameter for defining the approximate model when it is impossible to obtain the parameter for defining the learned model.

(5-4) Supplementary Note 4

A model building apparatus described in Supplementary Note 4 is the model building apparatus described in any one of Supplementary Notes 1 to 3, further including a generating unit that generates the adversarial example by entering the source sample into the generation model built by the building unit.

(5-5) Supplementary Note 5

A model building apparatus described in Supplementary Note 5 is the model building apparatus described in any one of Supplementary Notes 1 to 4, further including an evaluating unit that evaluates the adversarial examples outputted from the generation model.

(5-6) Supplementary Note 6

A model building method described in Supplementary Note 6 is a model building method including: a building step at which a generation model is built, wherein the generation model outputs an adversarial example, which causes misclassification by a learned model, when a source sample is entered into the generation model; and a calculating step at which a first evaluation value and a second evaluation value are calculated, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model, wherein the building builds the generation model by updating the generation model such that an index value based on the first and second evaluation values is smaller.

(5-7) Supplementary Note 7

A computer program described in Supplementary Note 7 is a computer program that allows a computer to execute the model building method described in Supplementary Note 6.

(5-8) Supplementary Note 8

A recording medium described in Supplementary Note 8 is a recording medium on which the computer program described in Supplementary Note 7 is recorded.

The present invention is not limited to the above-described examples and is allowed to be changed, if desired, without departing from the essence or spirit of the invention which can be read from the claims and the entire specification. A model building apparatus, a model building method, a computer program and a recording medium, which involve such changes, are also intended to be within the technical scope of the present invention.

DESCRIPTION OF REFERENCE CODES

1 Sample generation apparatus
11 CPU
111 Model learning unit
112 Loss calculation unit
113 Loss calculation unit
114 Loss integration unit
115 Sample generation unit
116b Model approximation unit
117c Sample evaluation unit
G Generation model
f Machine learning model
f' Approximate learning model
$x_s$ Source image
$c_s$ Source domain
AX Adversarial example
t Target class
$c_{AX}$ Target domain
X Training data set
x Training samples
c Training domain

What is claimed is:

1. A model building apparatus comprising a controller, the controller being programmed to:
build a generation model that outputs an adversarial example, which causes misclassification by a learned model, when a source sample is entered into the generation model; and
calculate a first evaluation value and a second evaluation value, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model,
wherein
the controller is programmed to build the generation model by updating the generation model such that an index value based on the first and second evaluation values is smaller,
the controller is further programmed to generate an approximate model for approximating the learned model, and
the controller is programmed to calculate the second evaluation value on the basis of a parameter for defining the approximate model.

2. The model building apparatus according to claim 1, wherein
the controller is programmed to (i) calculate the second evaluation value on the basis of a parameter for defining the learned model when it is possible to obtain the parameter for defining the learned model, and (ii) calculate the second evaluation value on the basis of the parameter for defining the approximate model when it is impossible to obtain the parameter for defining the learned model.

3. The model building apparatus according to claim 1, wherein
the controller is further programmed to generate the adversarial example by entering the source sample into the generation model built by the building unit.

4. The model building apparatus according to claim 1, wherein
the controller is further programmed to evaluate the adversarial examples outputted from the generation model.

5. A model building method comprising:
building a generation model that outputs an adversarial example, which causes misclassification by a learned model, when a source sample is entered into the generation model; and
calculating a first evaluation value and a second evaluation value, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model, wherein
building includes building the generation model by updating the generation model such that an index value based on the first and second evaluation values is smaller,
the method further comprising:
generating an approximate model for approximating the learned model, and
calculating the second evaluation value on the basis of a parameter for defining the approximate model.

6. A non-transitory recording medium on which a computer program that allows a computer to execute a model building method comprising:

building a generation model that outputs an adversarial example, which causes misclassification by a learned model, when a source sample is entered into the generation model; and
calculating a first evaluation value and a second evaluation value, wherein the first evaluation value is smaller as a difference is smaller between an actual visual feature of the adversarial example outputted from the generation model and a target visual feature of the adversarial example that are set to be different from a visual feature of the source sample, and the second evaluation value is smaller as there is a higher possibility that the learned model misclassifies the adversarial example outputted from the generation model, wherein
building includes building the generation model by updating the generation model such that an index value based on the first and second evaluation values is smaller,
the method further comprising:
generating an approximate model for approximating the learned model, and
calculating the second evaluation value on the basis of a parameter for defining the approximate model.

7. The model building apparatus according to claim 1, wherein the parameter includes at least one of variables and coefficients used to determine at least one of behavior, structure, and properties of an approximation model, and the parameter includes at least one of weighting and biases, hyperparameters, and decision thresholds.

8. The non-transitory recording medium according to claim 6, wherein the parameter includes at least one of variables and coefficients used to determine at least one of behavior, structure, and properties of an approximation model, and the parameter includes at least one of weighting and biases, hyperparameters, and decision thresholds.

* * * * *